(12) United States Patent
Atsushi et al.

(10) Patent No.: US 8,251,461 B2
(45) Date of Patent: Aug. 28, 2012

(54) BRAKE CONTROL DEVICE FOR TWO-WHEELED MOTOR VEHICLE

(75) Inventors: Hiroaki Atsushi, Yokohama (JP); Tohru Masuno, Yokohama (JP)

(73) Assignee: Bosch Corporation, Tokyo (JP)

( * ) Notice: Subject to any disclaimer, the term of this patent is extended or adjusted under 35 U.S.C. 154(b) by 430 days.

(21) Appl. No.: 12/523,755

(22) PCT Filed: Jan. 16, 2008

(86) PCT No.: PCT/JP2008/050397
§ 371 (c)(1),
(2), (4) Date: Jul. 20, 2009

(87) PCT Pub. No.: WO2008/090783
PCT Pub. Date: Jul. 31, 2008

(65) Prior Publication Data
US 2010/0045097 A1 Feb. 25, 2010

(30) Foreign Application Priority Data
Jan. 26, 2007 (JP) .................................. 2007-015859

(51) Int. Cl.
*B60T 8/26* (2006.01)
(52) U.S. Cl. ............... 303/16; 303/2; 303/9.64; 303/10; 303/20; 303/113.5; 303/114.2; 303/137; 303/139; 188/105; 188/106 P; 188/106 R; 188/344; 188/345; 701/71; 701/82
(58) Field of Classification Search ............ 303/10, 303/16, 9.61, 9.64, 9.72, 115.1, 115.5, 137; 188/344–345
See application file for complete search history.

(56) References Cited

U.S. PATENT DOCUMENTS

| | | | | |
|---|---|---|---|---|
| 5,273,346 A | * | 12/1993 | Tsuchida et al. | 303/2 |
| 6,390,566 B1 | | 5/2002 | Matsuno | |
| 2006/0082216 A1 | * | 4/2006 | Hamm et al. | 303/9.64 |
| 2007/0228817 A1 | * | 10/2007 | Tsuchida et al. | 303/115.1 |

FOREIGN PATENT DOCUMENTS

| | | |
|---|---|---|
| JP | 1134833 A | 2/1999 |
| JP | 200071962 A | 3/2000 |
| JP | 2000344173 A | 12/2000 |
| JP | 2005225441 A | 8/2005 |
| JP | 2006117233 A | 5/2006 |

* cited by examiner

*Primary Examiner* — Robert A Siconolfi
*Assistant Examiner* — San Aung
(74) *Attorney, Agent, or Firm* — Ronald E. Greigg

(57) ABSTRACT

To improve brake force in front and rear combined brake control, a brake control device includes a front wheel brake caliper having at least two front wheel cylinders, and a rear wheel brake caliper having a rear wheel cylinder. A front wheel brake conduit is disposed between a front wheel master cylinder and one of the front wheel cylinders, and a rear wheel brake conduit is disposed between a rear wheel master cylinder and the rear wheel cylinder. A pressure amplification conduit branches from a first position in the rear wheel brake conduit and merges with the rear wheel brake conduit at a second position downstream of the first position. A combined brake conduit branches from a third position in the rear wheel brake conduit positioned downstream of the first position and is coupled to the other of the front wheel cylinders. A first switch control valve is disposed between the first position and the third position in the rear wheel brake conduit. A second switch control valve in disposed in the pressure amplification conduit. A hydraulic pump is provided in the pressure amplification conduit, and a controlling device is provided that controls the opening and closing of the valves and actuation of the hydraulic pump.

10 Claims, 4 Drawing Sheets

BRAKE CONTROL DEVICE FOR TWO-WHEELED MOTOR VEHICLE

TECHNICAL FIELD

The present invention relates to a brake control device for a two-wheeled motor vehicle that enables increase control of brake pressure.

BACKGROUND ART

In JP-A-2003-25978, there is disclosed an active pressure amplifying technology where, in a brake control device for a two-wheeled motor vehicle comprising a front wheel master cylinder, a front wheel cylinder configured to be liquid-connectable to the front wheel master cylinder, a rear wheel master cylinder, a rear wheel cylinder configured to be liquid-connectable to the rear wheel master cylinder, and a hydraulic pump, when just the front wheel master cylinder is actuated, brake pressure fluid is supplied to the front wheel cylinder, the hydraulic pump is driven, and discharge pressure fluid of the hydraulic pump is supplied to the rear wheel cylinder. Further, in FIG. 2 of the same publication, there is described an embodiment where the brake control device further comprises a second front wheel cylinder configured to be liquid-connectable via a delay valve 42 to the rear wheel master cylinder.

In the above-described technology, the reason why the delay valve 42 is disposed is because the brake force of the front wheel is set large and, depending on the driver, when the two-wheeled motor vehicle travels on a narrow road or the like, this facilitates the brake force of the front wheel brake and keeps abrupt center-of-gravity movement forward to a minimum. Further, in the above-described technology, the discharge pressure fluid that has been active-pressure-amplified is only applied to the rear wheel cylinder because of the conduit configuration on the rear wheel side and is not applied to the front wheel cylinder because of the conduit configuration on the rear wheel side.
Patent Document 1: JP-A-2003-25978

DISCLOSURE OF THE INVENTION

Problems to be Solved by the Invention

The present invention has been made in view of the above-described circumstance, and it is an object thereof to further increase, in front and rear combined brake control, the effect of combined brake control and achieve adequate distribution of front and rear wheel brake force by applying hydraulic pressure that has been active-pressure-amplified by a rear wheel side conduit configuration not only to the rear wheel side but also to the front wheel side.

Means for Solving the Problems

In order to solve the above-described problem, a brake control device for a two-wheeled motor vehicle pertaining to a first aspect of the present invention is configured to include: at least two front wheel cylinders that generate fluid pressure for applying brake force to a front wheel; at least one rear wheel cylinder that generates fluid pressure for applying brake force to a rear wheel; a front wheel brake conduit that is coupled between a front wheel master cylinder and one of the front wheel cylinders; a rear wheel brake conduit that is coupled between a rear wheel master cylinder and the rear wheel cylinder; a pressure amplification conduit that branches from a first position in the rear wheel brake conduit and merges with the rear wheel brake conduit at a second position downstream of the first position; a combined brake conduit that branches from a third position in the rear wheel brake conduit positioned downstream of the first position and is coupled to the other of the front wheel cylinders; a first switch control valve that is disposed between the first position and the third position in the rear wheel brake conduit; a second switch control valve that is disposed in the pressure amplification conduit; a hydraulic pump that is disposed in the pressure amplification conduit; and a control device that controls the opening and closing of the valves disposed in the brake control device and actuation of the hydraulic pump.

According to the first aspect of the present invention, ordinarily, the first switch control valve is open and the second switch control valve is closed. Thus, ordinarily, the rear wheel is braked by brake operation of the rear wheel, When a predetermined condition has been established, the control device controls so as to close the first switch control valve and open the second switch control valve and also drives the hydraulic pump. Thus, high-pressure fluid is supplied from the pressure amplification conduit to both the combined brake conduit and the rear wheel brake conduit, and increased brake force is applied to both the front wheel and the rear wheel (active pressure amplification). Preferably, the control device detects pressure amplification of the front wheel master cylinder and, when the ratio of brake force on the rear wheel with respect to brake force on the front wheel does not match a predetermined ratio, determines that the predetermined condition has been established and executes active pressure amplification control. At this time, the control device controls brake force on the front wheel and the rear wheel such that the ratio of brake force on the rear wheel matches the predetermined ratio. When a driver steps on a foot pedal that links to the rear wheel master cylinder during brake operation of the rear wheel, brake fluid is discharged from the rear wheel master cylinder, so the stepping-on of the foot pedal is shallow, but the sensation is blunter than when operated by hand; consequently, some change in the stroke of the brake pedal does not become a problem sensorially. And when a hand lever that links to the front wheel/master cylinder is operated during this active pressure amplification control and brake operation on the front wheel has been executed, the lever stroke of the hand lever is not affected by active pressure amplification and is stable, and the driver can perform brake lever operation with good touch, because the front wheel brake conduit that is configured separately from the combined brake conduit is coupled between the front wheel master cylinder and one of the front wheel cylinders.

A brake control device of a more preferable aspect further includes a first supply control valve that is disposed in the front wheel brake conduit, a second supply control valve that is disposed downstream of the second position in the rear wheel brake conduit, and a third supply control valve that is disposed in the combined brake conduit. Because of the opening and closing of the first to third supply control valves, brake force from the front wheel master cylinder to the front wheel, brake force from the rear wheel master cylinder to the front wheel and brake force from the rear wheel master cylinder to the rear wheel can each be controlled. More preferably, when the pressure inside the rear wheel master cylinder has increased in a normal state where the first switch control valve is open and the second switch control valve is closed, the third supply control valve is opened and closed in response to vehicle velocity. That is, when the front wheel is strongly braked during low-speed travel, the vehicle becomes unstable, so the third supply control valve is narrowed by opening and closing and combined pressure on the front wheel is suppressed, and during high-speed travel, the third supply control valve is opened and brake combined efficiency is raised.

Preferably, the brake control device further includes at least one reservoir and further includes a first discharge conduit that is coupled between the front wheel brake conduit and the reservoir, a second discharge conduit that is coupled between the combined brake conduit and the reservoir, a third discharge conduit that is coupled between the rear wheel brake conduit and the reservoir, a first discharge control valve that is disposed in the first discharge conduit, a second discharge control valve that is disposed in the second discharge conduit, and a third discharge control valve that is disposed in the third discharge conduit. The first to third discharge control valves are ordinarily closed, but when brake pressure or brake pressure that has been actively amplified is excessive or there is the potential for wheel lock, these discharge control valves are opened, so that pressure fluid can be allowed to escape to the reservoir and pressure relief can be executed.

Preferably, the control device executes antilock brake operation by controlling the opening and closing of the first to third supply control valves and the first to third discharge control valves. More preferably, the control device controls the brake forces of the front wheel and the rear wheel in a predetermined ratio by controlling the opening and closing of the first to third supply control valves and the first to third discharge control valves. Thus, in the present invention, brake force can be effectively exerted.

The at least two front wheel cylinders may be disposed in one combined brake caliper. In a preferable aspect in this case, at least four of the front wheel cylinders are disposed inside the combined brake caliper, the combined brake caliper includes brake pads disposed facing each other on both sides of a brake disc and pistons configured to reciprocally move inside each of the front wheel cylinders, the pistons are attached in the same number each to the brake pad on one side and the brake pad on the other side in order to make it possible for the pistons to press the brake pads from both sides against the brake disc, and each of the front wheel brake conduit and the combined brake conduit respectively branches to at least two ports, with one of the branched ports being coupled to a cylinder for the piston of the brake pad on the one side and the other of the branched ports being coupled to a cylinder for the piston of the brake pad on the other side. According to this configuration, when the driver operates the hand lever and the pressure fluid of the front wheel brake conduit rises, the pressure fluid is supplied to the cylinders of the pistons of both pads disposed facing each other on both sides of the brake disc, so the pads on both sides respectively press the brake disc from the corresponding sides. Further, when active pressure amplification is executed and the pressure fluid of the combined brake conduit rises, the pressure fluid is supplied to the cylinders of the pistons of both pads disposed facing each other on both sides of the brake disc, so the pads on both sides respectively press the brake disc from the corresponding sides. During either brake operation or when both brake operations occur at the same time, the brake disc is pressed from both sides by the pads, so uneven wear of the brake pads can be prevented.

A second aspect of the present invention further includes, in addition to the configuration of the first aspect, a second brake caliper on the front wheel side separate from the combined brake caliper, wherein the second brake caliper includes at least one cylinder, and the front wheel brake conduit branches into two conduits, with one being coupled to the cylinder of the combined brake caliper and the other being coupled to the cylinder of the second brake caliper.

In the first and second aspects, the conduit configuration for active pressure amplification is disposed only in the conduit configuration on the rear wheel side and is not disposed in the conduit configuration on the front wheel side. In contrast, a third aspect of the present invention has a bidirectional configuration where the conduit configuration for active pressure amplification is disposed on both the front wheel side and the rear wheel side and which applies brake pressure that has been actively amplified not only to the front wheel side from the rear wheel side conduit configuration but also to the rear wheel side from the front wheel side conduit configuration via combined brake conduits on the front wheel side and the rear wheel side.

Consequently, a brake control device pertaining to a third aspect of the present invention is configured to include: at least two front wheel cylinders that generate fluid pressure for applying brake force to a front wheel; at least two rear wheel cylinders that generate fluid pressure for applying brake force to a rear wheel; a front wheel brake conduit that is coupled between a front wheel master cylinder and one of the front wheel cylinders; a rear wheel brake conduit that is coupled between a rear wheel master cylinder and one of the rear wheel cylinders; a front wheel pressure amplification conduit that branches from a first position in the front wheel brake conduit and merges with the front wheel brake conduit at a second position downstream of the first position; a front wheel combined brake conduit that branches from a third position in the front wheel brake conduit positioned downstream of the first position and is coupled to the other of the rear wheel cylinders; a first front wheel switch control valve that is disposed between the first position and the third position in the front wheel brake conduit; a second front wheel switch control valve that is disposed in the front wheel pressure amplification conduit; a front wheel hydraulic pump that is disposed in the front wheel pressure amplification conduit; a rear wheel pressure amplification conduit that branches from a first position in the rear wheel brake conduit and merges with the rear wheel brake conduit at a second position downstream of the first position; a rear wheel combined brake conduit that branches from a third position in the rear wheel brake conduit positioned downstream of the first position and is coupled to the other of the front wheel cylinders; a first rear wheel switch control valve that is disposed between the first position and the third position in the rear wheel brake conduit; a second rear wheel switch control valve that is disposed in the rear wheel pressure amplification conduit; a rear wheel hydraulic pump that is disposed in the rear wheel pressure amplification conduit; and a control device that controls the opening and closing of the valves disposed in the brake control device and actuation of the front wheel and rear wheel hydraulic pumps.

Preferably, ordinarily, the first front wheel and rear wheel switch control valves are open and the second front wheel and rear wheel switch control valves are closed, and when a predetermined condition has been established, the control device executes at least one of first pressure amplification control, where the control device controls so as to close the first front wheel switch control valve and open the second front wheel switch control valve and also drives the front wheel hydraulic pump, and second pressure amplification control, where the control device controls so as to close the first rear wheel switch control valve and open the second rear wheel switch control valve and also drives the rear wheel hydraulic pump.

More preferably, the control device detects pressure amplification of both of the front wheel master cylinder and the rear wheel master cylinder and, when the ratio of brake force on the rear wheel with respect to brake force on the front wheel does not match a predetermined ratio, determines that the predetermined condition has been established and executes at least one of the first pressure amplification control and the second pressure amplification control such that the ratio of brake force on the rear wheel matches the predetermined ratio.

In order to control brake pressure, preferably, the brake control device further includes first supply control valves that are respectively disposed in the front wheel and rear wheel brake conduits, second supply control valves that are respectively disposed downstream of the second positions in the rear front wheel and rear wheel brake conduits, and third supply control valves that are respectively disposed in the front wheel and rear wheel combined brake conduits. As mentioned before, when the pressure inside the rear wheel master cylinder has increased in a state where the first front wheel and rear wheel switch control valves are open and the second front wheel and wheel switch control valves are closed, it is preferable for the third supply control valve disposed in the rear wheel combined brake conduit to be opened and closed in response to vehicle velocity.

More preferably, the brake control device further includes at least one reservoir and further includes a first discharge conduit that is coupled between the front wheel combined brake conduit and the reservoir, a second discharge conduit that is coupled between the front wheel brake conduit and the reservoir, a third discharge conduit that is coupled between the rear wheel combined brake conduit and the reservoir, a fourth discharge conduit that is coupled between the rear wheel brake conduit and the reservoir, a first discharge control valve that is disposed in the first discharge conduit, a second discharge control valve that is disposed in the second discharge conduit, a third discharge control valve that is disposed in the third discharge conduit, and a fourth discharge control valve that is disposed in the fourth discharge conduit.

The control device can execute antilock brake operation by controlling the opening and closing of the first to fourth supply control valves and the first to fourth discharge control valves. Further, the control device can also control the brake forces of the front wheel and the rear wheel in a predetermined ratio by controlling the opening and closing of the first to fourth supply control valves and the first to fourth discharge control valves.

The at least two front wheel cylinders may be disposed in one combined brake caliper, and the at least two rear wheel cylinders may be disposed in another one combined brake caliper. In a preferable aspect in this case, at least four each of the front wheel and rear wheel cylinders are disposed inside the corresponding combined brake calipers, the front wheel and rear wheel combined brake calipers respectively include brake pads disposed facing each other on both sides of a brake disc and pistons configured to reciprocally move inside each of the front wheel and rear wheel cylinders, the pistons are attached in the same number each to the brake pad on one side and the brake pad on the other side in order to make it possible for the pistons to press the brake pads from both sides against the brake disc, and each of the front wheel and rear wheel brake conduits and the front wheel and rear wheel combined brake conduits respectively branches to at least two ports, with one of the branched ports being coupled to a cylinder for the piston of the brake pad on the one side and the other of the branched ports being coupled to a cylinder for the piston of the brake pad on the other side. Thus, as mentioned above in the first aspect, uneven wear of the brake pads can be eliminated in the front wheel and rear wheel combined brake calipers.

Figure 1:
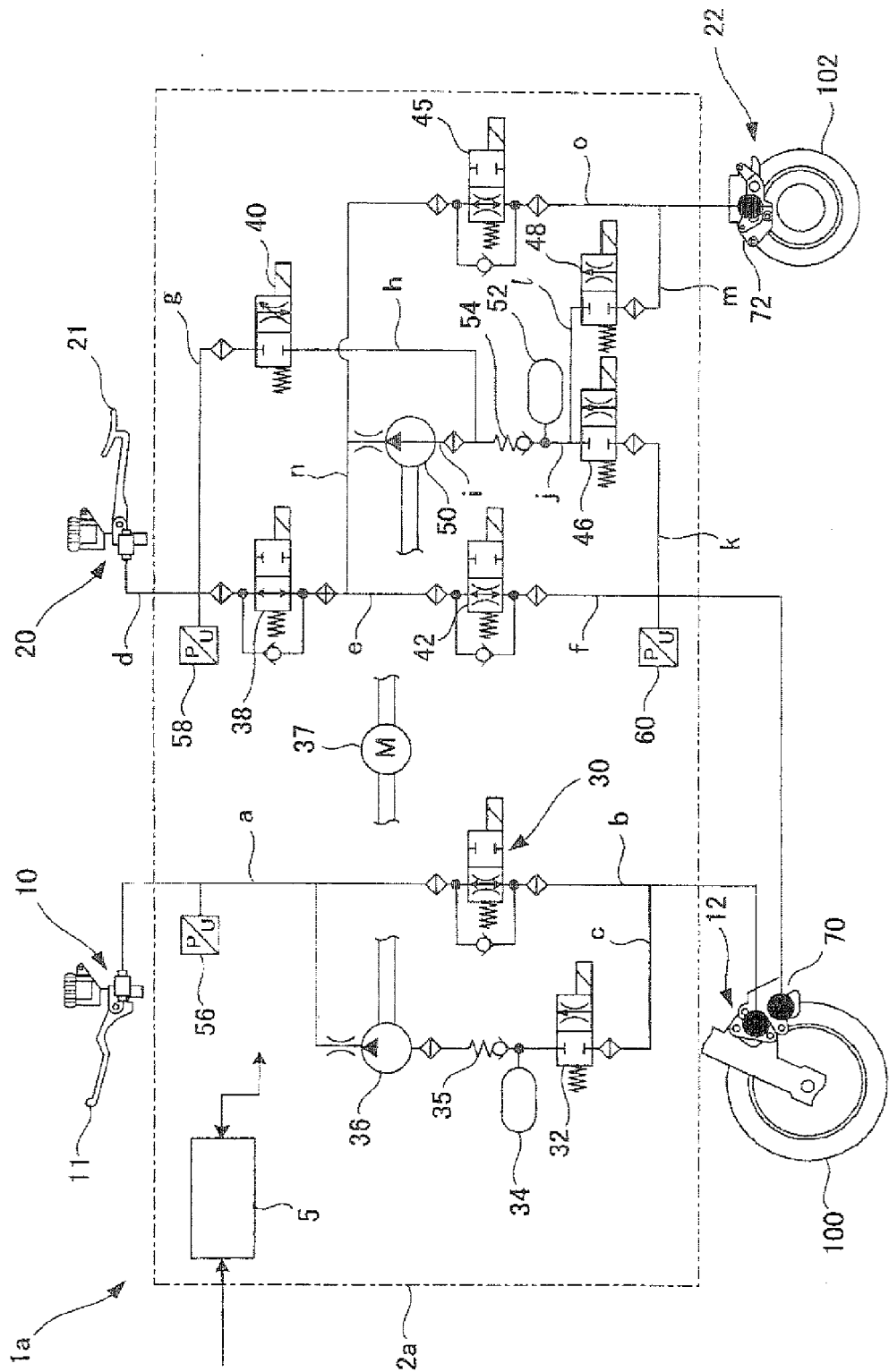
FIG. 1 is a circuit diagram of a brake control device pertaining to a first embodiment of the present invention.

EXPLANATION OF THE REFERENCE NUMERALS 1a, 1b, 1c Brake Control Devices
2a, 2b, 2c Brake Fluid Pressure Switch Control Devices
5 Control Unit
10 Front Wheel Master Cylinder
11 Hand Lever
12 Front wheel cylinder
20 Rear Wheel Master Cylinder
21 Foot Pedal
22 Rear wheel cylinder
30, 42, 45 In Valves
32, 46, 48 Release Valves
34, 52 Reservoirs
38 Electromagnetic Control Valve
40 High-Pressure Inlet Valve
50 Hydraulic Pump
56, 58, 60, 62 Pressure Sensors
70, 74, 76 (2-Port) Front Weel Brake Calipers
78 (2-Port) Rear Wheel Brake Calipers
80 Brake Disc
84, 85, 86, 87 Pistons
88, 89, 90, 91 Cylinders
92, 93 Brake Pads
100 Front Wheel
102 Rear Wheel

EMBODIMENTS

Below, embodiments of the present invention will be described with reference to the drawings.

First Embodiment

In FIG. 1, there is shown a brake control device 1a pertaining to a first embodiment of the present invention. This brake control device 1a is applied to a two-wheeled motor vehicle.

As shown in FIG. 1, the two-wheeled motor vehicle includes a front wheel 100 and a rear wheel 102, and the two-wheeled motor vehicle is equipped with a hand lever 11 that is operable by hand in order to brake the front wheel 100 and a foot pedal 21 that is operable by foot in order to brake the rear wheel 102. Further, the two-wheeled motor vehicle is also equipped with a front wheel master cylinder 10 for generating brake pressure for the front wheel in association with operation of the hand lever 11, a front wheel cylinder 12 for applying brake force to the front wheel, a rear wheel master cylinder 20 for generating brake pressure for the rear wheel in association with operation of the foot pedal 21, and a rear wheel cylinder 22 for applying brake force to the rear wheel. Between the front and rear wheel master cylinders (10, 20)

and the front and rear wheel cylinders (12, 22), there is disposed a brake fluid pressure switch control device 2a (the portion surrounded by the one-dot chain line) for switch-controlling brake fluid pressure. The brake fluid pressure switch control device 2a is a main configural requirement of the brake control device 1a.

The brake control device 1a is equipped with an in valve 30 and a release valve 32 inside the brake fluid pressure switch control device 2a. These valves 30 and 32 are publicly known 2-port, 2-position electromagnetic switch valves and assume either a communicated position or a cutoff position as a result of solenoids disposed in the valves being excited. An input port of the in valve 30 is connected to a conduit a that extends from the front wheel master cylinder 10. A pressure sensor 56 is attached to the conduit a in order to detect fluid pressure from the front wheel master cylinder 10. An output port of the in valve 30 is connected to a conduit b, and the conduit b is connected to the front wheel cylinder 12. Ordinarily, the in valve 30 is open, but during ABS control or the like, the application of fluid pressure from the front wheel master cylinder 10 to the front wheel cylinder 12 can be controlled by the opening and closing of the in valve 30. A conduit c is connected to the conduit a and the conduit b as a path parallel to the in valve 30. The release valve 32, a check valve 35 and a hydraulic pump 36 are disposed in the conduit c. The hydraulic pump 36 is driven by the rotation of a motor 37. Further, a reservoir 34 is connected to a conduit that branches from between the release valve 32 and the check valve 35. Consequently, pressure fluid of the conduit b flows into the reservoir 34 as a result of the release valve 32 opening, so that pressure can be relieved.

Moreover, the brake control device 1 is equipped with an electromagnetic control valve 38, a high-pressure inlet valve 40, an in valve 42, an in valve 45, a release valve 46 and a release valve 48 inside the brake fluid pressure switch control device 2a. These valves 38, 40, 42, 45, 46 and 48 are publicly known 2-port, 2-position electromagnetic switch valves, are ordinarily set to either a communicated position or a cutoff position, and are changed to either the cutoff position or the communicated position as a result of solenoids disposed in the valves being excited. Ordinarily, the electromagnetic control valve 38 is open and the high-pressure inlet valve 40 is closed. An input port of the electromagnetic control valve 38 is connected to a conduit d that extends from the rear wheel master cylinder 20. A pressure sensor 58 is attached to the conduit d in order to detect fluid pressure from the rear wheel master cylinder 20.

An output port of the electromagnetic control valve 38 is connected to a conduit e, an input port of the in valve 42 is connected to the conduit e, an output port of the in valve 42 is connected to a conduit f, and the conduit f is connected to the front wheel cylinder 12. Consequently, the application of fluid pressure from the rear wheel master cylinder 20 to the front wheel cylinder 12 can be controlled by the opening and closing of the in valve 42.

A conduit n branches from the conduit e, an input port of the in valve 45 is connected to the conduit n, an output port of the in valve 45 is connected to a conduit o, and the conduit o is connected to the rear wheel cylinder 22. Consequently, the application of fluid pressure from the rear wheel master cylinder 20 to the rear wheel cylinder can be controlled by the opening and closing of the in valve 45.

A conduit g branches from the conduit d, an input port of the high-pressure inlet valve 40 is connected to the conduit g, and a conduit h is connected to an output port of the high-pressure inlet valve 40. The conduit h branches into a conduit i and a conduit j. The conduit i is connected to a predetermined place of a conduit n, and a hydraulic pump 50 that is driven by the rotation of the motor 37 is interposed in the conduit i. These conduits (g, h, i) and the high-pressure inlet valve 40 and the hydraulic pump 50 form an active pressure amplification circuit.

In the active pressure amplification circuit, when the hydraulic pump 50 is driven in a state where the high-pressure inlet valve 40 is open, pressure fluid from the master cylinder 20 is sucked in, travels to the conduit n via the conduits d and g, the high-pressure inlet valve 40 and the conduits h and i, and can apply increased brake pressure to the front and rear wheel cylinders 12 and 22 via the in valves 42 and 45. That is, brake force to the front and rear wheels can be actively amplified. A pressure sensor 60 is attached to the conduit f particularly in order to detect fluid pressure that has been actively amplified.

An output port of the release valve 46 is connected to the conduit j via a check valve 54, a conduit k is connected to an input port of the release valve 46, and the conduit k is connected to a predetermined place of the conduit f. A reservoir 52 is connected to the conduit j on the input side of the check valve 54 of the conduit j. A conduit m branches from the conduit o and is connected to an input port of the release valve 48, a conduit 1 is connected to an output port of the release valve 48, and the conduit 1 is connected to a predetermined place of the conduit j on the output side of the release valve 46. The release valves 46 and 48 are ordinarily closed, but pressure fluid of the conduits f and o flow into the reservoir 52 via the conduits k and m as a result of the release valves 46 and 48 being opened, so that pressure inside the conduits f and o can be relieved to prevent application of excessive brake force.

Moreover, the brake control device 1a is equipped with a control unit 5 for ordering control of brake force. The control unit 5 executes predetermined control on the basis of, for example, external parameters such as the wheel velocities of the front wheel 100 and the rear wheel 102 and the velocity, acceleration and deceleration of the vehicle body and internal parameters such as the fluid pressures that have been detected by the pressure sensors 56, 58 and 60. For example, the control unit 5 judges whether to ease, hold or increase braking of the front and rear wheels and, on the basis of this judgment, controls, so as to excite or not excite, the solenoids of the valves 30, 32, 38, 40, 42, 45, 46 and 48, drives the pump 50 as needed and performs active pressure amplification. Thus, the fluid pressures supplied to the wheel cylinders 12 and 22 are held, lowered or increased, and antilock brake control corresponding to a road surface A is executed. Moreover, the control unit 5 performs control for executing optimum distribution of brake force between the front wheel 100 and the rear wheel 102. For example, the control device 5 distributes brake force between front wheel brake force and rear wheel brake force in a predetermined ratio (as one example, 7:3) corresponding to vehicle body deceleration. That is, the present invention realizes a brake control system where combined brake control and antilock brake control are merged together.

Figure 4:
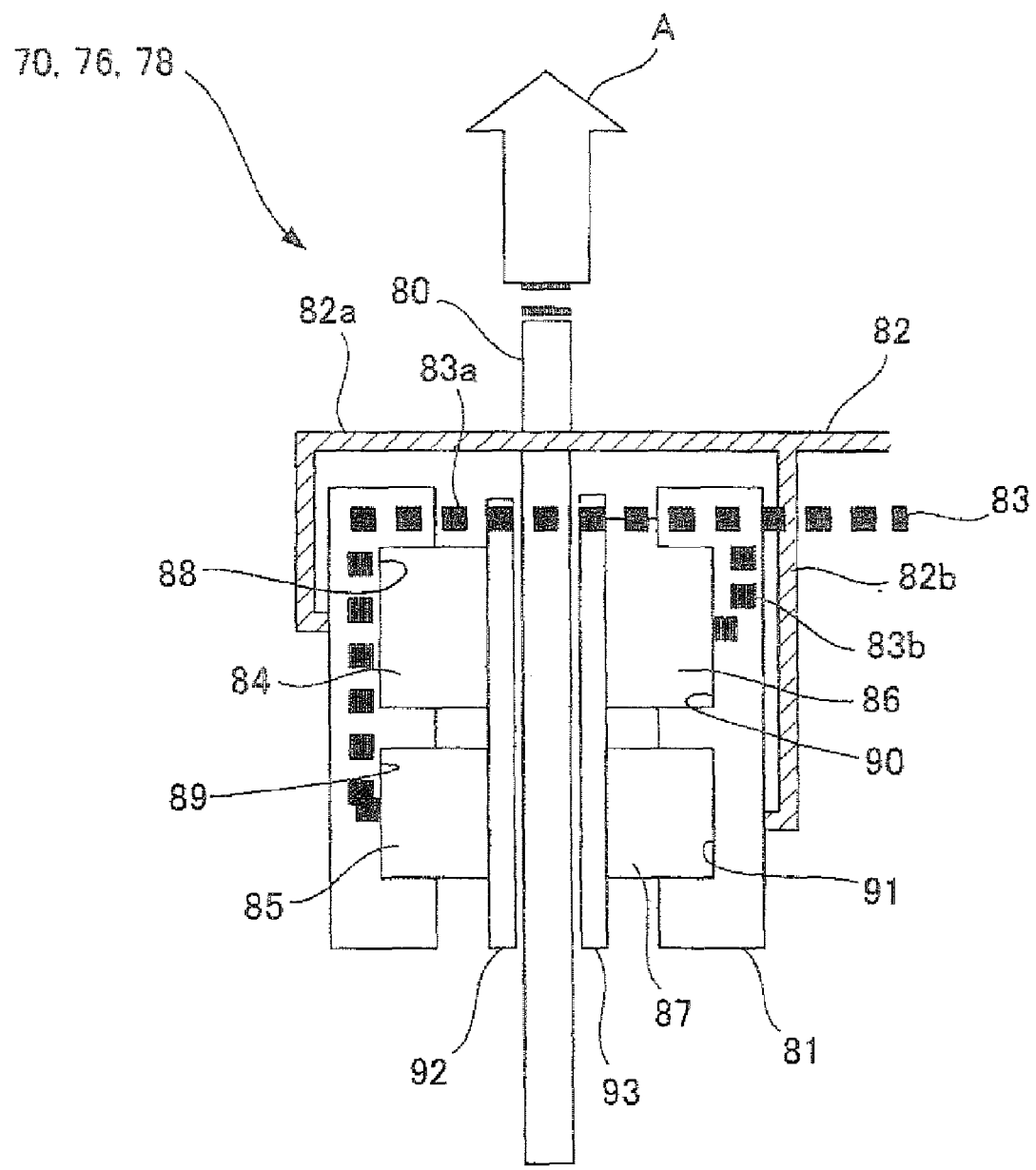
FIG. 4 is a general configural diagram of a brake caliper that is applicable to the embodiments of the present invention.

The application of brake force to the front wheel 100 and the rear wheel 102 is executed via a front wheel brake caliper 70 and a rear wheel brake caliper 72. Here, the front wheel brake caliper 70 has a configuration that applies, to a brake disc by one caliper, brake pressure fluid that has been supplied via the conduit b from the front wheel master cylinder 10 and brake pressure fluid that has been supplied via the conduit f from the rear wheel side. In FIG. 4, there is shown the configuration of the front wheel brake caliper 70.

As shown in FIG. 4, the brake configuration portion of the two-wheeled motor vehicle is equipped with a brake disc 80 and a pair of pads 92 and 93 that are disposed away from the disk on both sides of the brake disc 80. The front wheel brake caliper 70 is configured to use fluid pressure to push the pair of pads 92 and 93 of the brake configuration portion against the brake disc 80 and thus apply brake force to the wheel. In order to realize this, the front wheel brake caliper 70 is equipped with two pistons 84 and 85 that are attached to the brake pad 92, two pistons 86 and 87 that are attached to the brake pad 93, cylinders 88, 89, 90 and 91 that slidably house these pistons, and a caliper housing 81 in which these cylinders are formed.

Moreover, the front wheel brake caliper 70 is equipped with a port 82 that is communicated with the conduit f of FIG. 1 for combined brake control of the front wheel and a port 83 that is communicated with the conduit b for normal brake force application resulting from the hand lever 11. The port 82 is divided into two ports 82a and 82b, with the port 82a being connected to the cylinder 88 and the port 82b being connected to the cylinder 91 disposed on the opposite side of the brake disc 80. Further, the port 83 is divided into two ports 83a and 83b, with the port 83a being connected to the cylinder 89 and the port 83b being connected to the cylinder 90 disposed on the opposite side of the brake disc 80. According to this configuration, in either case of normal brake force application or combined brake control between the front wheel and the rear wheel, or in a case where both of those are executed, the pads 92 and 93 are pushed against the brake disc 80 from both sides at the same time, and uneven wear of the brake pad can be prevented.

It will be noted that the rear wheel brake caliper 72 has a 1-port configuration to which just the conduit o is connected, but similar to the configuration of FIG. 4, the rear wheel brake caliper 72 can also employ an opposing 2-piston configuration where one port is divided into two ports, the two ports are communicated with two cylinders disposed on opposite sides of a brake disc, and the pistons slide inside the cylinders. In this case also, it goes without saying that uneven wear of the brake pad can be prevented.

Next, the action of the brake control device 1a pertaining to the first embodiment of the present invention will be described.

It will be assumed that the hand lever 11 has been operated. In this case, the control unit 5 detects an increase in the fluid pressure that has been detected by the pressure sensor 56 or that a brake switch on the hand lever has been switched ON. At this time, the control unit 5 opens the high-pressure inlet valve 40 and the in valves 42 and 45, closes the electromagnetic switch valve 38, and drives the hydraulic pump 50. Because of the action of the hydraulic pump 50, pressure fluid is sucked in via the high-pressure inlet valve 40 from the rear wheel master cylinder 20, the pressure fluid flows into the conduit n via the conduits h and i, and pressure fluid that has been actively amplified is respectively supplied to the front wheel brake caliper 70 via the conduit e, the in valve 42 and the conduit f and to the rear wheel brake caliper 72 via the in valve 45 and the conduit o. That is, the rear wheel is also braked in association with the braking of the front wheel, and brake fluid pressure that has been actively amplified is applied also to the front wheel cylinder. Because of the opening and closing of the in valves 42 and 45, as mentioned above, brake force to the front and rear wheels can be appropriately distributed. Antilock brake operation is performed when the control unit 5 judges that it is necessary to prevent brake lock from the vehicle conditions and the state of the road surface μ.

Pressure fluid that has been actively amplified is also supplied to the front wheel brake caliper 70 during this braking of the rear wheel. However, as shown in FIG. 1, brake pressure fluid resulting from operation of the hand lever 11 passes through the conduits a and b, and pressure fluid that has been actively amplified passes through the separate conduit f. In addition, as shown in FIG. 4, inside the front wheel brake caliper 70, the port from the conduit b and the port from the conduit f are configured separately, and their pressure fluids do not become mixed in with each other. Consequently, even when pressure fluid that has been actively amplified is being supplied, the lever stroke of the hand lever 11 is stable, and the driver can perform brake lever operation with good touch. And when the driver steps on the foot pedal 21 during this braking of the rear wheel, brake fluid is discharged from the rear wheel master cylinder 20, so the stepping-on of the foot pedal 21 is shallow, but the sensation is blunter than when operated by hand; consequently, some change in the stroke of the brake pedal does not become a problem sensorially.

Further, the pressure, on the front wheel brake caliper 70, of brake pressure fluid that has been actively amplified is also appropriately controlled by the opening and closing of the in valve 42 and the like, so it is not necessary to dispose a delay valve as in the above-described related art, brake force on the front wheel side can be facilitated, and abrupt center-of-gravity movement forward can be suppressed.

The control unit 5 drives the hydraulic pump 50 and performs the aforementioned active pressure amplification control, and also performs combined brake control between the front and rear wheels, even when the control unit 5 has judged that the rear wheel 102, which is a drive wheel, has skidded. The release valves 46 and 48 are ordinarily closed, but when the control unit 5 has judged that brake force that has been actively amplified is excessive, the control unit 5 closes the in valve 45, opens the release valves 46 and 48, and discharges pressure fluid to the reservoir 52. At this time, the control unit 5 performs antilock brake operation when the control unit 5 has judged that it is necessary to prevent brake lock from the vehicle conditions and the state of the road surface μ.

It will now be assumed that the foot pedal 21 has been operated in a state where the hand lever 11 is not being operated. In this case, the control unit 5 detects an increase in the fluid pressure that the pressure sensor 58 has detected or that a brake switch on the foot pedal has been switched ON. At this time, the in valve 45 is opened in a normal valve state where the electromagnetic switch valve 38 is open and the high-pressure inlet valve 40 is closed. For this reason, brake pressure corresponding to the operation amount of the foot pedal 21 of the present invention is transmitted not only to the rear wheel brake caliper 72 but also to the front wheel brake caliper 70 via the combined brake conduits (e, f), and brake force is applied to both the front and rear wheels. In this case, it is not always the case that the ratio of brake force on the front and rear wheels becomes an ideal brake distribution, but in comparison to the related art where brake force is applied only to the rear wheel by operation of only the foot pedal 21, a brake force distribution that is closer to ideal can be achieved.

Further, it is preferable for the in valve 42 to be controlled so as to open and close in response to vehicle velocity. That is, when the front wheel 100 is strongly braked during low-speed travel, the vehicle becomes unstable, so the in valve 42 is narrowed by opening and closing operation and combined pressure on the front wheel 100 is suppressed. During high-speed travel, the in valve 42 is opened and brake combined efficiency is raised. In this manner, pressure fluid corresponding to the operation amount of the driver that has occurred in the rear wheel master cylinder 20 is applied to the rear wheel cylinder 22 via the in valve 45, the rear wheel is braked, and the front wheel 100 is braked by pressure that has been adjusted by the in valve 42.

Thereafter, when the hand lever 11 has been operated during the above-described brake control, brake pressure corresponding to the operation amount of the driver is applied to the front wheel 100 in addition to the adjusted brake pressure from the rear wheel master cylinder 20 as described above. At this time, when the brake pressure on the rear wheel has already achieved a target brake pressure that becomes an ideal distribution with respect to the brake pressure on the front wheel, the aforementioned active pressure amplification control is not executed. Thereafter, at a point in time when the brake pressure on the rear wheel has dropped below the target brake pressure, such as when the operation amount of the hand lever 11 increases and the brake pressure on the front wheel rises, the aforementioned active pressure amplification control is executed and the front and rear wheel brake force distribution is appropriately controlled.

Second Embodiment

Next, a second embodiment of the present invention will be described using FIG. 2. It will be noted that, in FIG. 2, configural elements that are the same as the configural elements in FIG. 1 will be given reference numerals and reference signs that are the same as those in FIG. 1, detailed description thereof will be omitted, and just the portions that are different will be described.

Figure 2:
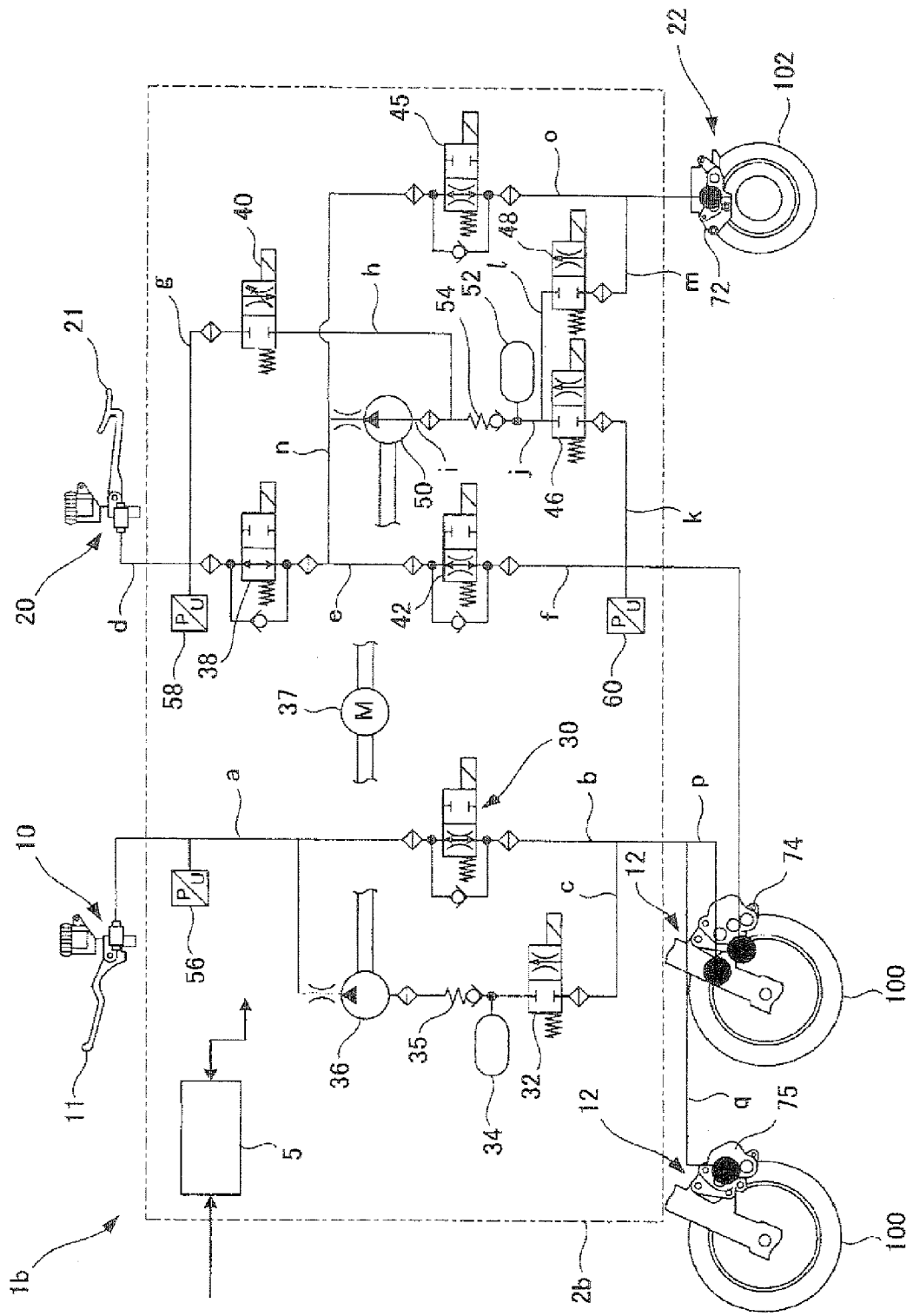
FIG. 2 is a circuit diagram of a brake control device pertaining to a second embodiment of the present invention.

As shown in FIG. 2, a brake control device 1b pertaining to the second embodiment is further equipped with a combined brake caliper 74 on the front wheel side and a second brake caliper 75 that is configured separately from the combined brake caliper 74. The combined brake caliper 74 has a configuration which, similar to the combined brake caliper 70, applies, to a brake disc by one caliper, brake pressure fluid that has been supplied via the conduit b from the front wheel master cylinder 10 and brake pressure fluid that has been supplied via the conduit f from the rear wheel side.

In the second embodiment, the front wheel brake conduit b branches into two conduits p and q, with the one conduit p being coupled to a cylinder of the combined brake caliper 74 and the other conduit q being coupled to a cylinder of the second brake caliper 75. That is, the brake control device 1b pertaining to the second embodiment is configured to apply brake fluid pressure generated by operation of the hand pedal lever 11 to the front wheel via two ports.

Third Embodiment

Figure 3:
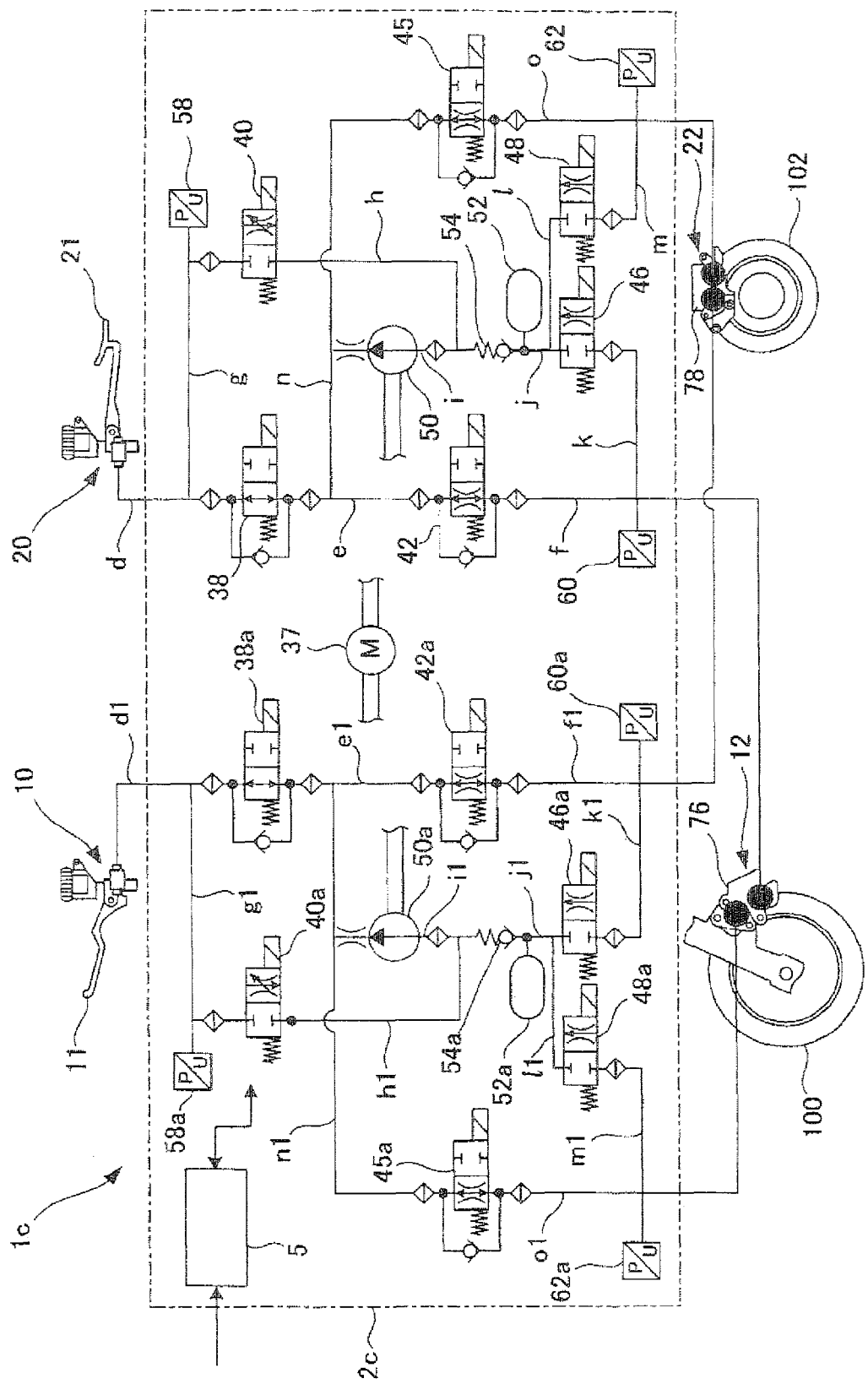
FIG. 3 is a circuit diagram of a brake control device pertaining to a third embodiment of the present invention.

Next, a third embodiment of the present invention will be described using FIG. 3. It will be noted that, in FIG. 3, configural elements that are the same as the configural elements in FIG. 1 will be given reference numerals and reference signs that are the same as those in FIG. 1, and detailed description thereof will be omitted.

In a brake control circuit 1c pertaining to the third embodiment, in the brake circuit on the front wheel side, similar to the rear wheel side, there is disposed a circuit that enables active pressure amplification and combined brake control of the rear wheel. In the brake circuit on the front wheel side, in regard to configural elements that are the same as those in the rear wheel side brake circuit, "a" will be added to the numbers of configural elements on the front wheel side, and in regard to conduits that are the same as those in the rear wheel side brake circuit, the number "1" will be added to alphabetical letters of the conduits on the front wheel side, and detailed description will be omitted. It will be noted that the brake control circuit 1c pertaining to the third embodiment is further disposed with pressure sensors 62 and 62a for detecting fluid pressure in the conduits o and o1 to enable accurate pressure control.

A front wheel brake caliper 76 has a 2-port configuration similar to the configuration shown in FIG. 4, and the conduit o1 of the front wheel brake circuit and the conduit f of the rear wheel brake circuit are connected to the front wheel brake caliper 76. Thus, brake pressure from the front wheel master cylinder 10 or brake pressure that has been actively amplified by the front wheel brake circuit and brake pressure from the rear wheel master cylinder 20 or brake pressure that has been actively amplified by the rear wheel brake circuit are applied to the front wheel brake caliper 76. A rear wheel brake caliper 78 has a 2-port configuration similar to the configuration shown in FIG. 4, and the conduit of the rear wheel brake circuit and the conduit f1 of the front wheel brake circuit are connected to the rear wheel brake caliper 78. Thus, brake pressure from the rear wheel master cylinder 20 or brake pressure that has been actively amplified by the rear wheel brake circuit and brake pressure from the front wheel master cylinder 10 or brake pressure that has been actively amplified by the front wheel brake circuit are applied to the rear wheel brake caliper 78. The control unit 5 controls the brake forces of the front and rear wheels applied via the brake calipers 76 and 78 such that the front wheel brake force and the rear wheel brake force become an appropriate distribution ratio.

In the first and second embodiments, the active pressure amplification circuit disposed on just the rear wheel side is actuated when the hand lever has been operated, but in the third embodiment, in operation of only one of either the hand lever or the foot pedal, the active pressure amplification circuit on either the front wheel side or the rear wheel side is also not actuated. When pressure increases in the master cylinders 10 and 20 on the front wheel side and the rear wheel side are detected in a state where both the hand lever 11 and the foot pedal 21 have been operated, the control unit 5 controls both or either one of the active pressure amplification circuits on the front wheel side and the rear wheel side such that the front wheel brake force and the rear wheel brake force become an appropriate distribution ratio.

The above-described active pressure amplification control of the third embodiment is one example, and other control methods are also possible. For example, when just one of either the hand lever 11 or the foot pedal 21 is operated and a pressure increase in the master cylinder of either one of the front wheel side or the rear wheel side is detected, the active pressure amplification circuit on the opposite side of the side that has been amplified (in the case of hand lever operation, the active pressure amplification circuit on the rear wheel side, and in the case of foot pedal operation, the active pressure amplification circuit on the front wheel side) is controlled to achieve a target brake pressure that is set on the basis of a pressure increase value of that master cylinder.

These are the embodiments of the present invention, but the present invention is not limited only to the above-described examples and is arbitrarily suitably alterable within the scope of the present invention that is set forth by the claims.

For example, in the preceding embodiments, operation of the foot pedal 21 is configured to be associated with the rear wheel brake, but the foot pedal can also be configured as a second hand lever. That is, braking of the front and rear wheels may be controlled by right and left hand levers. As two-wheeled vehicles with this brake configuration, for example, there are scooters and the like.

The invention claimed is:

1. A brake control device for a two-wheeled motor vehicle comprising:
    at least two front wheel cylinders that generate fluid pressure for applying brake force to a front wheel; at least two rear wheel cylinders that generate fluid pressure for applying brake force to a rear wheel;
    a front wheel brake conduit that is coupled between a front wheel master cylinder and one of the front wheel cylinders;
    a rear wheel brake conduit that is coupled between a rear wheel master cylinder and one of the rear wheel cylinders;
    a front wheel pressure amplification conduit that branches from a first position in the front wheel brake conduit and merges with the front wheel brake conduit at a second position downstream of the first position;
    a front wheel combined brake conduit that branches from a third position in the front wheel brake conduit positioned downstream of the first position and is coupled to the other of the rear wheel cylinders;
    a first front wheel switch control valve that is disposed between the first position and the third position in the front wheel brake conduit;
    a second front wheel switch control valve that is disposed in the front wheel pressure amplification conduit; a front wheel hydraulic pump that is disposed in the front wheel pressure amplification conduit;
    a rear wheel pressure amplification conduit that branches from a first position in the rear wheel brake conduit and merges with the rear wheel brake conduit at a second position downstream of the first position;
    a rear wheel combined brake conduit that branches from a third position in the rear wheel brake conduit positioned downstream of the first position and is coupled to the other of the front wheel cylinders;
    a first rear wheel switch control valve that is disposed between the first position and the third position in the rear wheel brake conduit;
    a second rear wheel switch control valve that is disposed in the rear wheel pressure amplification conduit; a rear wheel hydraulic pump that is disposed in the rear wheel pressure amplification conduit; and
    a control device that controls the opening and closing of the valves disposed in the brake control device and actuation of the front wheel and rear wheel hydraulic pumps.

2. The brake control device according to claim 1, wherein the first front wheel and rear wheel switch control valves are normally open and the second front wheel and rear wheel switch control valves are normally closed, and wherein when a predetermined condition has been established, the control device executes at least one of first pressure amplification control, where the control device controls so as to close the first front wheel switch control valve and open the second front wheel switch control valve and also drives the front wheel hydraulic pump, and second pressure amplification control, where the control device controls so as to close the first rear wheel switch control valve and open the second rear wheel switch control valve and also drives the rear wheel hydraulic pump.

3. The brake control device according to claim 2, wherein the controlling device, when the pressure inside both of the front wheel master cylinder and the rear wheel master cylinder has increased and the ratio of brake force on the rear wheel with respect to brake force on the front wheel does not match a predetermined ratio, determines that the predetermined condition has been established and executes at least one of the first pressure amplification control and the second pressure amplification control such that the ratio of brake force on the rear wheel matches the predetermined ratio.

4. The brake control device according to claim 1, further comprising:
    first supply control valves that are respectively disposed in the front wheel and rear wheel brake conduits;
    second supply control valves that are respectively disposed downstream of the second positions in the rear wheel and rear wheel brake conduits; and
    third supply control valves that are respectively disposed in the front wheel and rear wheel combined brake conduits.

5. The brake control device according to claim 4, wherein when the pressure inside the rear wheel master cylinder has increased in a state where the first front wheel and rear wheel switch control valves are open and the second front wheel and rear wheel switch control valves are closed, the third supply control valve disposed in the rear wheel combined brake conduit is opened and closed in response to vehicle velocity.

6. The brake control device according to claim 4, farther comprising at least one reservoir and further comprising:
    a first discharge conduit that is coupled between the front wheel combined brake conduit and the reservoir;
    a second discharge conduit that is coupled between the front wheel brake conduit and the reservoir;
    a third discharge conduit that is coupled between the rear wheel combined brake conduit and the reservoir;
    a fourth discharge conduit that is coupled between the rear wheel brake conduit and the reservoir;
    a first discharge control valve that is disposed in the first discharge conduit;
    a second discharge control valve that is disposed in the second discharge conduit;
    a third discharge control valve that is disposed in the third discharge conduit; and
    a fourth discharge control valve that is disposed in the fourth discharge conduit.

7. The brake control device according to claim 6, wherein the control device executes antilock brake operation by controlling the opening and closing of the first to fourth supply control valves and the first to fourth discharge control valves.

8. The brake control device according to claim 6, wherein the control device controls the brake forces of the front wheel and the rear wheel in a predetermined ratio by controlling the opening and closing of the first to fourth supply control valves and the first to fourth discharge control valves.

9. The brake control device according to claim 1, wherein the at least two front wheel cylinders are disposed in one combined brake caliper, and the at least two rear wheel cylinders may be disposed in another one combined brake caliper.

10. The brake control device according to claim 9,
    wherein at least four each of the front wheel and rear wheel cylinders are disposed inside the corresponding combined brake calipers,
    wherein the front wheel and rear wheel combined brake calipers respectively include brake pads disposed facing each other on both sides of a brake disc and pistons configured to reciprocally move inside each of the front wheel cylinders,
    wherein the pistons are attached in the same number each to the brake pad on one side and the brake pad on the other side in order to make it possible for the pistons to press the brake pads from both sides against the brake disc, and wherein each of the front wheel and rear wheel brake conduits and the front wheel and rear wheel combined brake conduits respectively branches to at least two ports, with one of the branched ports being coupled to a cylinder for the piston of the brake pad on the one side and the other of the branched ports being coupled to a cylinder for the piston of the brake pad on the other side.

* * * * *